US012641121B2

(12) United States Patent
Heumphreus et al.

(10) Patent No.: US 12,641,121 B2
(45) Date of Patent: May 26, 2026

(54) ELECTRONIC DECOY APPARATUS AND ASSOCIATED METHODS

(71) Applicant: The Boeing Company, Arlington, VA (US)

(72) Inventors: Paul Robert Heumphreus, Decatur, AL (US); Nicholas Martin Wyckoff, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 60 days.

(21) Appl. No.: 18/657,120

(22) Filed: May 7, 2024

(65) Prior Publication Data

US 2025/0350640 A1      Nov. 13, 2025

(51) Int. Cl.
   *H04L 9/40*          (2022.01)
(52) U.S. Cl.
   CPC ................................ *H04L 63/1491* (2013.01)
(58) Field of Classification Search
   CPC .................................................. H04L 63/1491
   See application file for complete search history.

(56) References Cited

U.S. PATENT DOCUMENTS

| | | | |
|---|---|---|---|
| 11,973,585 B2 * | 4/2024 | Reynolds ................. | H04K 3/46 |
| 2017/0149825 A1 * | 5/2017 | Gukal ................. | H04L 63/1491 |
| 2018/0023928 A1 * | 1/2018 | Grundner ................. | F41H 11/02 |
| | | | 342/12 |
| 2020/0366402 A1 * | 11/2020 | Dunn ...................... | G01S 19/18 |

FOREIGN PATENT DOCUMENTS

WO      WO-2021048516 A1 *      3/2021      .............. F41H 11/02

OTHER PUBLICATIONS

Jing Zhao et al. "A Design of Portable Radar Broadband Jamming and Decoy Signal Generator" 2012 International Workshop on Information and Electronics Engineering (IWIEE), pp. 760-764. https://www.sciencedirect.com/science/article/pii/S1877705812000471 (Year: 2011).*

Harry Lye. "Using UGVs for decoy and deception: Digital Concepts Engineering" Published Nov. 26, 2020 (6 pages) https://www.army-technology.com/features/using-ugvs-for-decoy-and-deception-digital-concepts-engineering/?cf-view (Year: 2020).*

* cited by examiner

*Primary Examiner* — Joseph P Hirl
*Assistant Examiner* — Thomas A Gyorfi
(74) *Attorney, Agent, or Firm* — Hanley, Flight & Zimmerman, LLC

(57)          ABSTRACT

An electronic decoy apparatus and associated methods are disclosed. An example apparatus includes a housing, a signal emitter coupled to the housing, a processor coupled to the housing and electrically coupled to the signal emitter, and a memory device operatively coupled to the processor, the memory device including machine-readable instructions to cause the processor to generate a first signal to be emitted by the signal emitter, the first signal to resemble a second signal emitted by at least one protected device.

20 Claims, 9 Drawing Sheets

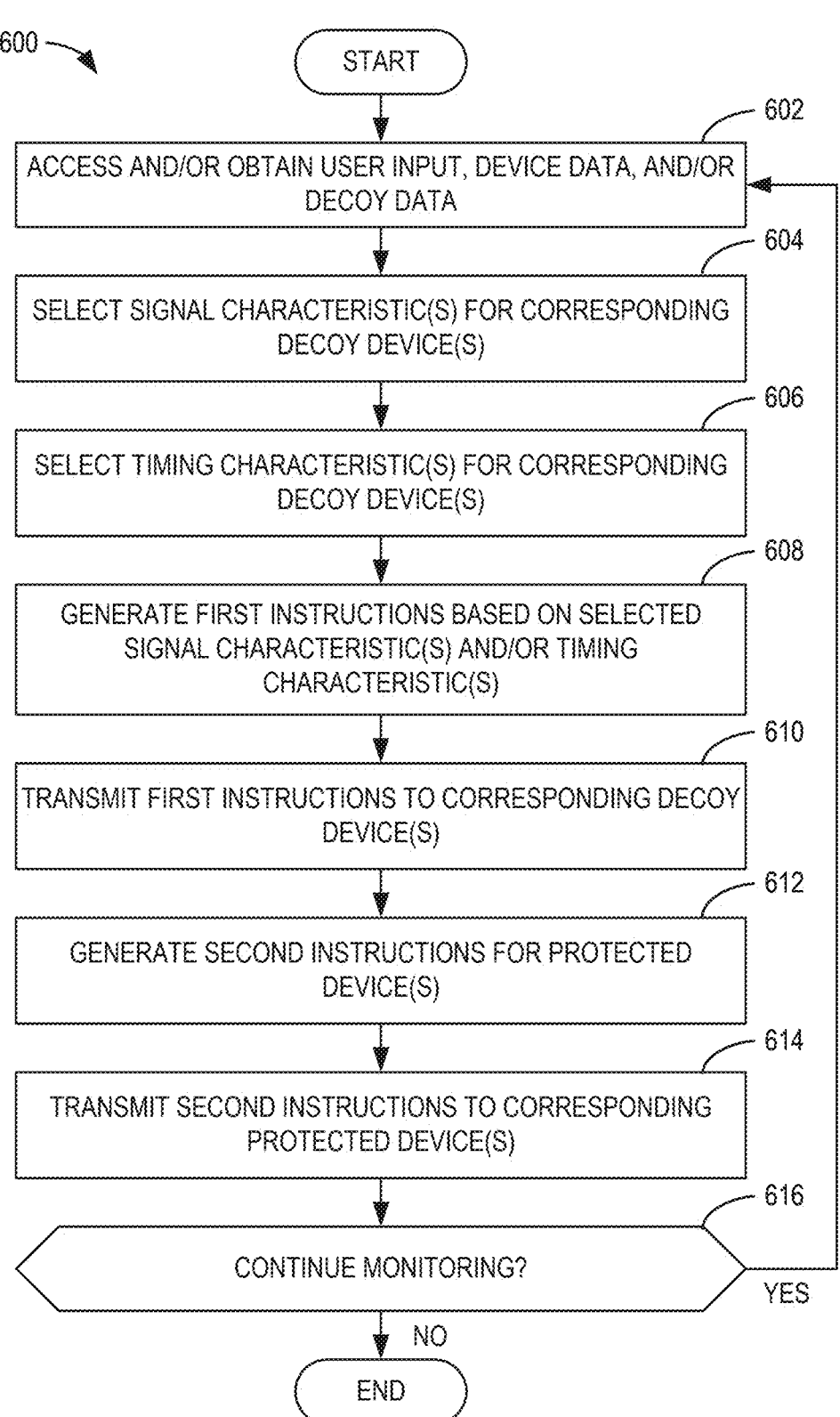

600

START

602 — ACCESS AND/OR OBTAIN USER INPUT, DEVICE DATA, AND/OR DECOY DATA

604 — SELECT SIGNAL CHARACTERISTIC(S) FOR CORRESPONDING DECOY DEVICE(S)

606 — SELECT TIMING CHARACTERISTIC(S) FOR CORRESPONDING DECOY DEVICE(S)

608 — GENERATE FIRST INSTRUCTIONS BASED ON SELECTED SIGNAL CHARACTERISTIC(S) AND/OR TIMING CHARACTERISTIC(S)

610 — TRANSMIT FIRST INSTRUCTIONS TO CORRESPONDING DECOY DEVICE(S)

612 — GENERATE SECOND INSTRUCTIONS FOR PROTECTED DEVICE(S)

614 — TRANSMIT SECOND INSTRUCTIONS TO CORRESPONDING PROTECTED DEVICE(S)

616 — CONTINUE MONITORING?    YES

NO

END

FIG. 6

ELECTRONIC DECOY APPARATUS AND ASSOCIATED METHODS

FIELD OF THE DISCLOSURE

This disclosure relates generally to decoy systems and, more particularly, to an electronic decoy apparatus and associated methods.

BACKGROUND

In some scenarios, one or more devices (e.g., electronic devices) may be deployed in an area to conduct radar operations, gather information, facilitate communications, and/or perform one or more additional tasks associated with a mission. Some electronic devices (e.g., power generators) emit detectable spurious Radio Frequency (RF) energy during normal operation. Hostile actors have demonstrated the ability to exploit emissions from devices to provide targeting information and, as a result, some such devices may be susceptible to attacks or malicious interference. For instance, the devices may be damaged, destroyed, and/or incapacitated by hostile measures and/or enemy attacks. As a result, such devices may be unable to perform and/or complete a desired task and/or mission. Decoy devices may disrupt attempts by hostile actors to achieve sufficient targeting accuracy for hostile measures and/or enemy attacks to significantly affect operations.

SUMMARY

An example apparatus includes a housing, a signal emitter coupled to the housing, a processor coupled to the housing and electrically coupled to the signal emitter, and a memory device operatively coupled to the processor, the memory device including machine-readable instructions to cause the processor to generate a first signal to be emitted by the signal emitter, the first signal to resemble a second signal emitted by at least one protected device.

An example apparatus includes memory first machine-readable instructions, and at least one processor circuit to be programmed by the first machine-readable instructions to at least generate second machine-readable instructions corresponding to a decoy device, and transmit the second machine-readable instructions to processor circuitry of the decoy device, the second machine-readable instructions to cause the processor circuitry to generate a first signal to be emitted by the decoy device, the first signal to resemble a second signal emitted by at least one protected device.

An example apparatus includes processor circuitry and machine-readable instructions to cause the processor circuitry to generate a first signal to be emitted by a decoy device, the first signal to resemble a second signal emitted by at least one protected device.

An example method includes generating a first signal based on machine-readable instructions and causing emission of the first signal by a decoy device, the first signal to resemble a second signal emitted by at least one protected device.

BRIEF DESCRIPTION OF THE DRAWINGS

FIG. 6 is a flowchart representative of example machine readable instructions and/or example operations that may be executed, instantiated, and/or performed by example programmable circuitry to implement the example system control circuitry of FIG. 4.

Figure 1:
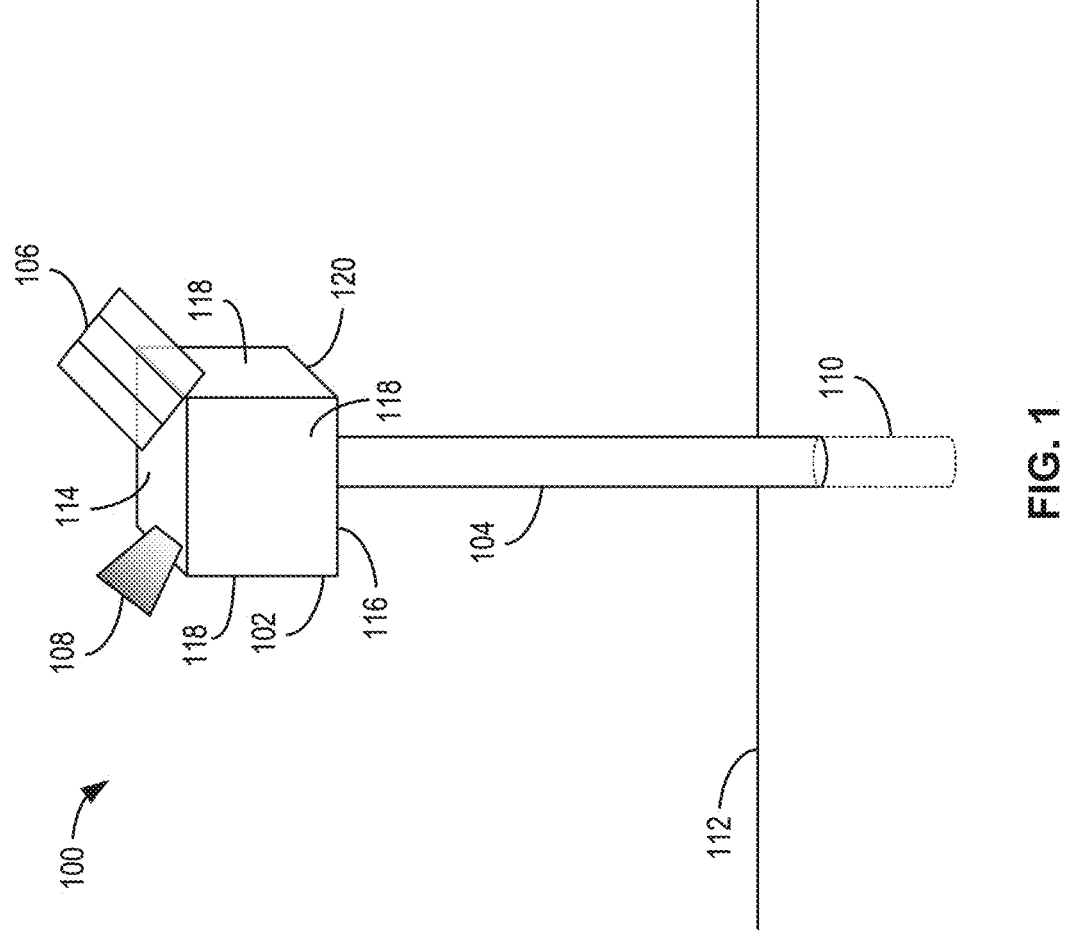
FIG. 1 illustrates an example decoy device constructed in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In some situations, devices (e.g., electronic devices) deployed for use in a mission can be susceptible to attacks and/or malicious interference. In particular, the device(s) can be damaged, destroyed, and/or incapacitated by hostile measures (e.g., missiles, gunfire, etc.). As a result, the device(s) may be prevented from successfully performing their intended function. In some instances, decoys (e.g., decoy devices) have been used to cause confusion, drain enemy resources, and/or draw attacks away from targeted (e.g., protected) assets (e.g., communication devices, military infrastructure, humans, etc.). Some such decoys (e.g., visual decoys) are constructed to physically resemble one(s) of the targeted assets. Because destruction of the decoys is expected to occur, the decoys are typically relatively primitive. For instance, the decoys frequently do not include electronics and, thus, are incapable of communication and/or other advanced functionality. However, in recent years, some hostile measures have been developed that may detect and/or be guided toward targeted device(s) based on signals (e.g., electromagnetic signals) emitted by the device(s). In such cases, primitive decoys (e.g., decoys that do not include electronics and, thus, do not emit electromagnetic signal(s)) may not be effective in drawing such hostile measures away from the targeted device(s).

Examples disclosed herein provide an effective, compact, lightweight, and/or relatively low-cost countermeasure solution to reduce and/or prevent destruction and/or disablement of protected (e.g., targeted) devices. In particular, disclosed herein is an example decoy device (e.g., an electronic decoy device, a beacon device) that may be used to draw and/or direct hostile measures away from one or more protected devices. The decoy device includes an example processor (e.g., processor circuitry, a processor card) positioned in an example housing (e.g., a casing). In some examples, one or more example signal emitters (e.g., antenna(s), radiating aperture(s)) are coupled to the housing and electrically and/or operatively coupled to the processor. Further, an example memory device (e.g., a memory card, a Secure Digital (SD) card) is removably and/or operatively coupled to the processor, where the memory device includes example instructions (e.g., machine-readable instructions) to cause the processor to generate a first example signal to be emitted by the signal emitter(s). In some examples, the first signal is an electromagnetic signal (e.g., a radio frequency signal) that resembles (e.g., mimics, imitates) a second example signal emitted by one(s) of the protected devices. For example, the first signal can have similar example signal characteristic(s) (e.g., waveform, frequency, etc.) compared to the second signal, but the first signal includes meaning-less, misleading, and/or false information. As a result, hostile measures that operate based on the detection of electromagnetic signals may inadvertently target the decoy device instead of the protected devices, thereby reducing risk of damage to and/or destruction of the protected devices.

In some examples, multiple ones of the decoy devices can be deployed in an environment to operate in a coordinated manner. For example, example system control circuitry can be communicatively coupled to processor circuitry of the respective decoy devices. In some examples, the system control circuitry generates and/or provides example instructions to the respective decoy devices to cause the decoy devices to emit signals at respective different durations and/or having respective different signal characteristics. In some examples, the multiple decoy devices can emit the signals at a similar time and/or for a similar duration to resemble, for example, a relatively large and/or complex system (e.g., a military base, communication infrastructure, etc.). In some examples, the multiple decoy devices can emit the signals sequentially and/or in a staggered manner to resemble movement of the protected device(s) and, thus, to draw hostile measures toward and/or away from a given location. Additionally, in some examples, the system control circuitry can temporarily halt operation of one or more protected devices (e.g., during emission of the signal(s) by one or more decoy devices). Advantageously, by drawing hostile measures toward the decoy device(s) and/or away from the protected device(s), examples disclosed herein can reduce likelihood of damage to and/or interference with the protected device(s) and, thus, can reduce cost associated with repair and/or replacement of the protected device(s), and/or can reduce duration(s) of outage(s) resulting from the hostile measures.

FIG. 1 illustrates an example decoy device (e.g., an electronic decoy device) 100 constructed in accordance with teachings of this disclosure. In the illustrated example of FIG. 1, the decoy device 100 includes an example housing (e.g., a casing) 102 coupled (e.g., removably coupled) to an example post (e.g., a stake) 104. Further, an example solar panel 106 and an example emitter (e.g., a signal emitter) 108 are coupled to the housing 102. In some examples, the emitter 108 includes an example antenna (e.g., an aperture antenna, a radiating aperture) to emit (e.g., output) one or more example signals (e.g., electromagnetic signal(s)). In some examples, the solar panel 106 is electrically and/or operatively coupled to one or more electronic components included and/or contained in the housing 102. For example, the solar panel 106 may be used to charge one or more batteries of the decoy device 100, where the batteries can be used to provide power to the electronic component(s). In some examples, the solar panel 106 may be omitted, and/or the decoy device 100 can include one or more different example power sources to power one(s) of the electronic components.

In this example, a portion 110 of the post 104 is shown extending into a ground 112, such that the post 104 and/or the housing 102 are fixed (e.g., stationary) relative to the ground 112. In some examples, the post 104 can be removed from the ground 112 to enable repositioning and/or transport of the decoy device 100 between two or more locations. In some examples, a length of the post 104 (e.g., between the ground 112 and the housing 102) is approximately six feet or less. In some examples, the length of the post 104 may be different (e.g., greater than six feet). While only one post 104 is used in this example, multiple posts may be used in some examples to couple the housing 102 to the ground 112. In some examples, by supporting the housing 102 at a distance above the ground, the post 104 can improve signal quality and/or a travel range of the signal(s) emitted by the decoy device 100 (e.g., by reducing obstructions along a travel path of the signal(s)). Additionally, while the decoy device 100 is stationary in this example, the decoy device 100 can be movable relative to the ground 112 in some examples. For example, the decoy device 100 (e.g., housing 102 and/or the post 104) can be coupled to a moving object (e.g., an unmanned ground vehicle) in some examples, such that the decoy device 100 can move with the moving object relative to the ground 112.

In the illustrated example of FIG. 1, the housing 102 is cube-shaped and includes a top surface 114, a bottom surface 116, and side surfaces 118 (three of which are labelled in FIG. 1). In some examples, one or more of the surfaces 114, 116, 118 of the housing 102 are detachable and/or foldable at one or more respective edges 120 of the housing 102 (one of which is labelled in FIG. 1). In such examples, one(s) of the surfaces 114, 116, 118 can be detached and/or folded at the respective edge(s) 120 to facilitate storage and/or transportation of the housing 102. Additionally, in this example, the emitter 108 and/or the solar panel 106 are pivotably coupled to the housing 102. In some examples, the emitter 108 and/or the solar panel 106 can be pivoted and/or folded toward the top surface 114 and/or respective one(s) of the side surfaces 118 to further facilitate storage and/or transportation of the housing 102.

While the housing 102 is substantially cube-shaped in the illustrated example of FIG. 1, the housing 102 can have a different shape (e.g., spherical, cylindrical, etc.) in some examples. In some examples, a shape of the housing 102 corresponds to a shape of one or more protected devices. For example, the protected device(s) may include a communication device, a radar, a drone control station, a command post, a radar early warning site, a missile defense system, a vehicle (e.g., a High Mobility Multipurpose Vehicle (HMMV)), a power generator, a human-carried radio backpack, nodes of communication networks, etc. Additionally, in some examples, one or more outer surfaces (e.g., one(s) of the surfaces 114, 116, 118) of the housing 102 can be marked and/or painted to visually resemble the protected device(s). In some examples, the housing 102 includes a first example material (e.g., plastic, wood, metal, a composite material, etc.), and the post 104 includes a second example material (e.g., wood, metal, etc.), where the second material can be the same as and/or different from the first material. In this example, a size of the housing 102 is approximately one cubic foot. In some examples, the size of the housing 102 may be different.

Figure 2:
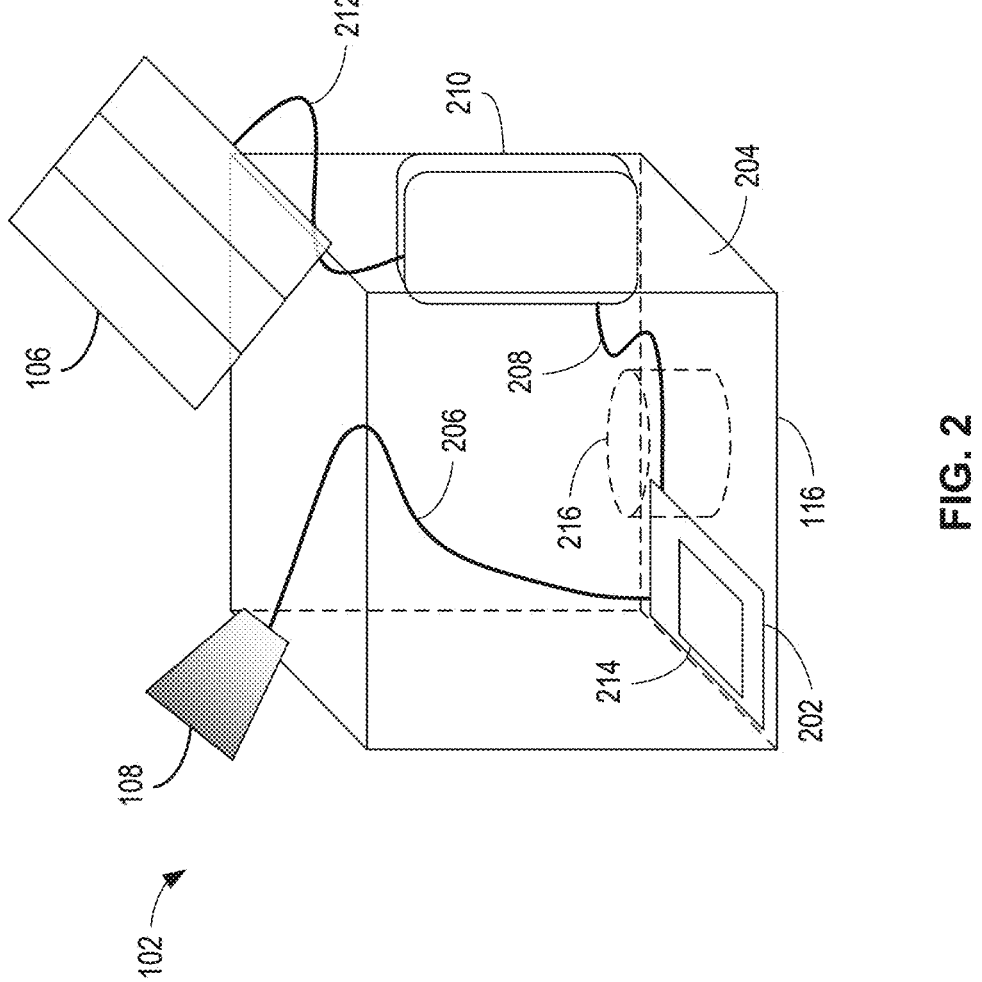
FIG. 2 is a partial transparent view of an example housing of the example decoy device of FIG. 1.

FIG. 2 is a partial transparent view of the example housing 102 of FIG. 1. In the illustrated example of FIG. 2, the housing 102 includes an example processor (e.g., a processor card, a processing board, processor circuitry) 202 positioned on and/or coupled (e.g., removably coupled) to an inner surface 204 of the housing 102. The processor 202 is electrically and/or operatively coupled to the emitter 108 via a first example wired connection 206. Further, the processor 202 is electrically coupled, via a second example wired connection 208, to an example battery 210 positioned in and/or coupled (e.g., removably coupled) to the housing 102. In this example, the battery 210 is electrically coupled to the solar panel 106 via a third example wired connection 212. In the example of FIG. 2, an example memory device (e.g., a memory card, a SD card) 214 is coupled (e.g., operatively and/or removably coupled) to the processor 202.

In the illustrated example of FIG. 2, the battery 210 receives (e.g., via the third wired connection 212) and/or stores power generated and/or output by the solar panel 106. In some examples, the battery 210 is used to power the processor 202 (e.g., via the second wired connection 208). In some examples, the solar panel 106 may be omitted, and the battery 210 can be a rechargeable battery (e.g., a lithium battery) that may be recharged and/or replaced periodically to maintain power to the processor 202.

In some examples, the processor 202 generates and/or selects one or more example signals (e.g., decoy signal(s)) to be emitted by the emitter 108. For example, based on example instructions (e.g., machine-readable instructions) stored in the memory device 214, the processor 202 can select one or more example signal characteristics and/or one or more example timing characteristics for the signal(s) to be emitted by the emitter 108. For example, the signal characteristic(s) can include a waveform type, a frequency, an amplitude, etc. associated with the emitted signal(s). Further, the timing characteristic(s) can include example time(s) (e.g., start time(s)) at which the signal(s) are to be emitted and/or example duration(s) for which the signal(s) are to be emitted. In some examples, the processor 202 selects the signal characteristic(s) and/or the timing characteristic(s) such that first signal(s) emitted by the emitter 108 are to resemble (e.g., mimic, emulate) second signal(s) (e.g., device signal(s)) emitted by one or more protected devices (e.g., target device(s)). For example, the first signal(s) can have similar example signal characteristic(s) (e.g., waveform, frequency, etc.) compared to the second signal(s), but the first signal(s) include meaningless, misleading, and/or false information. As a result, when the first signal(s) are detected by hostile measures, the decoy device 100 may be mistaken for one(s) of the protected devices and, thus, may draw such hostile measures away from the protected device(s) and/or toward the decoy device 100.

In some examples, different machine-readable instructions can be loaded onto the memory device 214 to cause the processor 202 to generate one or more different signals. Additionally or alternatively, the memory device 214 can be replaced with different example memory device(s) including the different machine-readable instructions. In some examples, the memory device 214 can include a Secure Digital (SD) card, a microSD card, a Universal Serial Bus (USB) drive, and/or a different type of memory device that can be manually installed on the processor 202.

In the illustrated example of FIG. 2, the housing 102 includes an example aperture (e.g., an opening) 216 defined in the bottom surface 116 of the housing 102 and/or extending into the housing 102. In some examples, the aperture 216 is to receive an end of the post 104 of FIG. 1 to couple (e.g., removably couple) the housing 102 to the post 104 and/or to the ground 112 of FIG. 1. In the example of FIG. 2, the aperture 216 is cylindrical. In some examples, the aperture 216 can have a different shape (e.g., a shape that is complementary to a shape of the post 104).

Figure 3A:
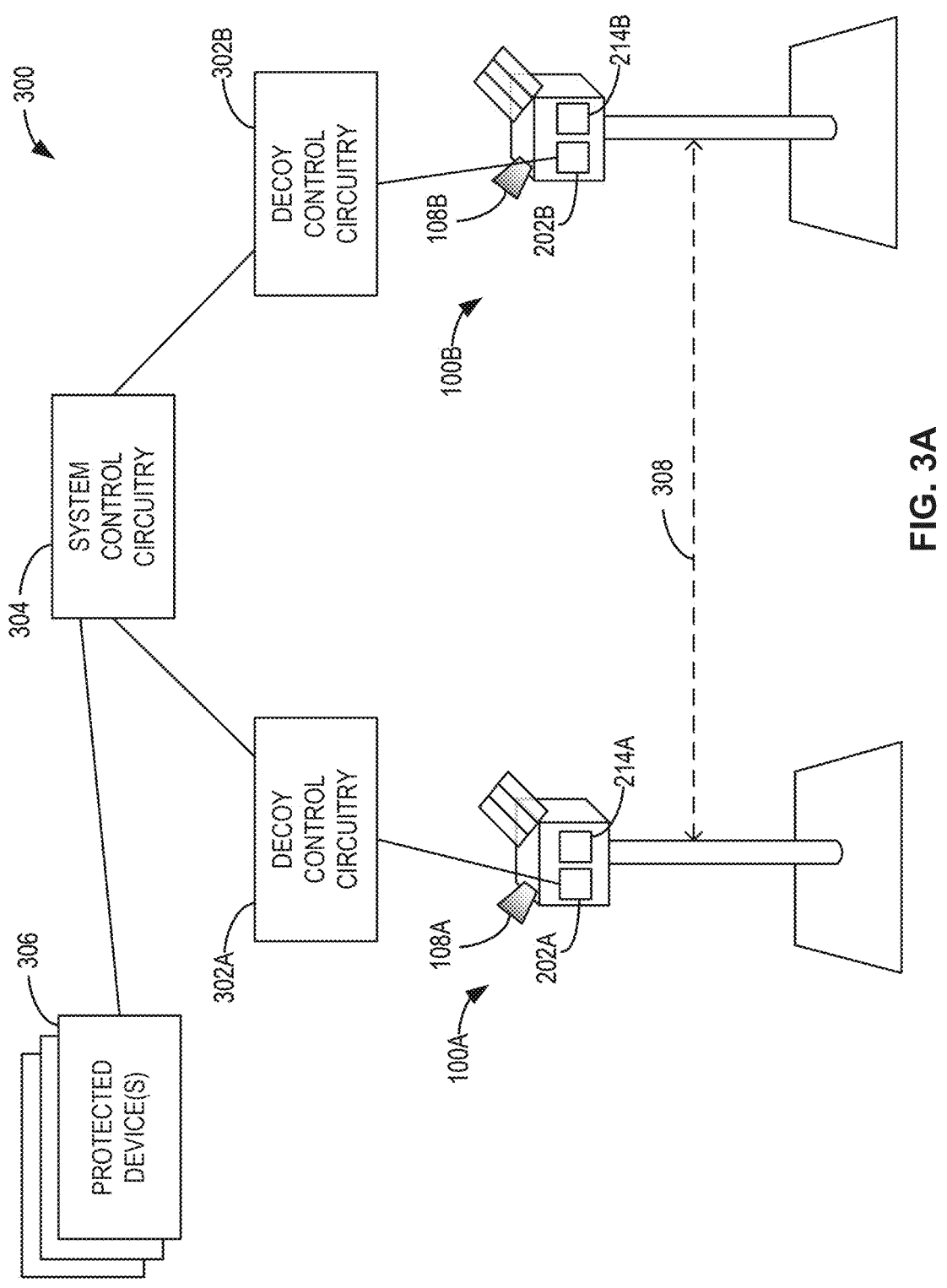
FIG. 3A illustrates an example environment including first and second example decoy devices, where the first and second decoy devices implement example decoy control circuitry communicatively coupled to example system control circuitry in accordance with teachings of this disclosure.

FIG. 3A illustrates an example environment 300 including first and second example decoy devices 100A, 100B, where the first and second decoy devices 100A, 100B implement respective instances of example decoy control circuitry 302A, 302B communicatively coupled to example system control circuitry 304 in accordance with teachings of this disclosure. In the illustrated example of FIG. 3A, the system control circuitry 304 is further communicatively coupled to one or more example protected devices (e.g., targeted devices) 306 from which the decoy device(s) 100A, 100B are to draw and/or redirect one or more hostile measures. In some examples, the protected device(s) 306 may be omitted (e.g., the system control circuitry 304 is not communicatively coupled to the protected device(s) 306). Further, while two of the decoy devices 100A, 100B are shown in FIG. 3A, a different number of decoy devices (e.g., one, three or more) can be communicatively coupled to the system control circuitry 304 in some examples.

In the illustrated example of FIG. 3A, the decoy control circuitry 302A, 302B is implemented by example processors 202A, 202B of respective ones of the decoy devices 100A, 100B. In some examples, the decoy devices 100A, 100B are positioned at respective first and second geographic locations and are separated by an example distance 308. In this example, the system control circuitry 304 is implemented at a remote location (e.g., different from the first geographic location and/or the second geographic location) and is communicatively coupled to the decoy control circuitry 302A, 302B via network connection(s), wireless connection(s) (e.g., a radio frequency (RF) link), wired connection(s) (e.g., ethernet), etc.

In some examples, the decoy control circuitry 302A, 302B executes first example instructions (e.g., first machine-readable instructions) preloaded on example memory devices 214A, 214B of the respective decoy devices 100A, 100B. Additionally or alternatively, the decoy control circuitry 302A, 302B executes second example instructions (e.g., second machine-readable instructions) received and/or obtained from the system control circuitry 304. In some examples, the first instructions and/or the second instructions include example signal characteristic(s) and/or example timing characteristic(s) corresponding to one or more signals (e.g., decoy signal(s)) to be emitted by the respective decoy device(s) 100A, 100B. In some examples, as a result of the execution of the first instructions and/or the second instructions, the decoy devices 100A, 110B can emit (e.g., via respective example emitters 108A, 108B) the signal(s) based on the respective signal characteristic(s) and/or timing characteristic(s).

In some examples, the system control circuitry 304 provides (e.g., sends, transmits) the second instructions to the respective first and second decoy devices 100A, 100B to cause the decoy devices 100A, 100B to emit one or more signals in a coordinated manner. For example, the system control circuitry 304 can cause the first and second decoy devices 100A, 100B to emit the first and second signals, respectively, at substantially the same time and/or for substantially the same duration. In some such examples, the first and second signals can have similar signal characteristics (e.g., similar waveform type, similar frequency, etc.), and/or one or more of the signal characteristics may differ between the first and second signals. In some examples, when the first and second signals are emitted concurrently (e.g., at a same or similar time and/or for a same or similar duration), the first and second decoy devices 100A, 100B can emulate (e.g., resemble, mimic) relatively large and/or complex protected device(s) 306 when the first and second signals are detected by hostile measure(s).

Additionally or alternatively, the system control circuitry 304 can cause (e.g., via the second instructions) the first and second decoy devices 100A, 100B to emit the respective first and second signals in a staggered and/or sequential manner. For example, the system control circuitry 304 can cause the first decoy device 100A to emit the first signal at a first example start time and/or for a first example duration, and the system control circuitry 304 can cause the second decoy device 100B to emit the second signal at a second example start time and/or for a second example duration. In some examples, the second start time occurs after the first start time, and the first duration does not overlap with the second duration (e.g., the second duration follows the first duration). For example, the second start time can correspond to an end of the first duration in some examples, such that the first and second signals are emitted sequentially. In some examples, the first and second durations can overlap (e.g., the second start time occurs during the first duration).

In some examples, when the first and second signals are emitted in a staggered and/or sequential manner, the first and second decoy devices 100A, 100B can resemble and/or emulate movement of the protected device(s) 306 within a geographic area. For example, when the first and second signals are utilized (e.g., by hostile measures) to detect the protected device(s) 306, the protected device(s) 306 can appear to be at a first example position (e.g., a first geographic location) of the first decoy device 100A when the first decoy device 100A emits the first signal, and the protected device(s) 306 can appear to be at a second example position (e.g., a second geographic location) of the second decoy device 100B when the second decoy device 100B emits the second signal. As a result, the protected device(s) 306 appear to move from the first position (e.g., at the first start time and/or for the first duration) to the second position (e.g., at the second start time and/or for the second duration).

In some examples, the system control circuitry 304 selects the timing characteristic(s) (e.g., start time(s) and/or duration(s)) corresponding to the respective first and second signals based on distance(s) (e.g., geographic distance(s)) between the protected device(s) 306 and respective one(s) of the decoy devices 100A, 100B. In the example of FIG. 3A, the first decoy device 100A is at a first example distance from the protected device(s) 306, and the second decoy device 100B is at a second example distance (e.g., greater than the first distance) from the protected device(s) 306. In some such examples, the system control circuitry 304 causes the second decoy device 100B to emit the second signal after the first decoy device 100A emits the first signal (e.g., the second start time is after the first start time). As a result, the protected device(s) 306 can appear (e.g., to hostile measures) to be moving away from an actual location (e.g., a ground truth location) of the protected device(s) 306, thereby drawing the hostile measures away from the actual location of the protected device(s) 306 to reduce a risk of damage to and/or interference with the protected device(s) 306.

In some examples, the system control circuitry 304 selects an example delay (e.g., a time delay) between the first and second signals (e.g., between the first and second start times) based on the distance 308 between the first and second decoy devices 100A, 100B. For example, to resemble movement of the protected device(s) 306 at a target speed, the system control circuitry 304 determines the delay based on the target speed and the distance 308 (e.g., by dividing the distance 308 by the given speed).

In some examples, the system control circuitry 304 can temporarily shut off (e.g., deactivate, halt operation of) one(s) of the protected device(s) 306. For example, to further reduce detection of the protected device(s) 306 by one or more hostile measures, the system control circuitry 304 can shut off the one(s) of the protected device(s) 306 for a third example duration corresponding to the first and second durations of the respective first and second signals. Stated differently, the system control circuitry 304 can halt emission of signal(s) by the one(s) of the protected device(s) 306 during emission of the first signal and/or the second signal by the decoy device(s) 100A, 100B. In some examples, the system control circuitry 304 can output and/or provide third example instructions to the one(s) of the protected device(s) 306, where the third instructions indicate a third example start time at which the protected device(s) 306 are to be shut off and/or the third duration for which the protected device(s) 306 are to be shut off. Additionally or alternatively, the system control circuitry 304 can activate and/or deactivate one(s) of the protected device(s) 306 by enabling and/or halting one or more control signals to the protected device(s) 306.

Figure 3B:
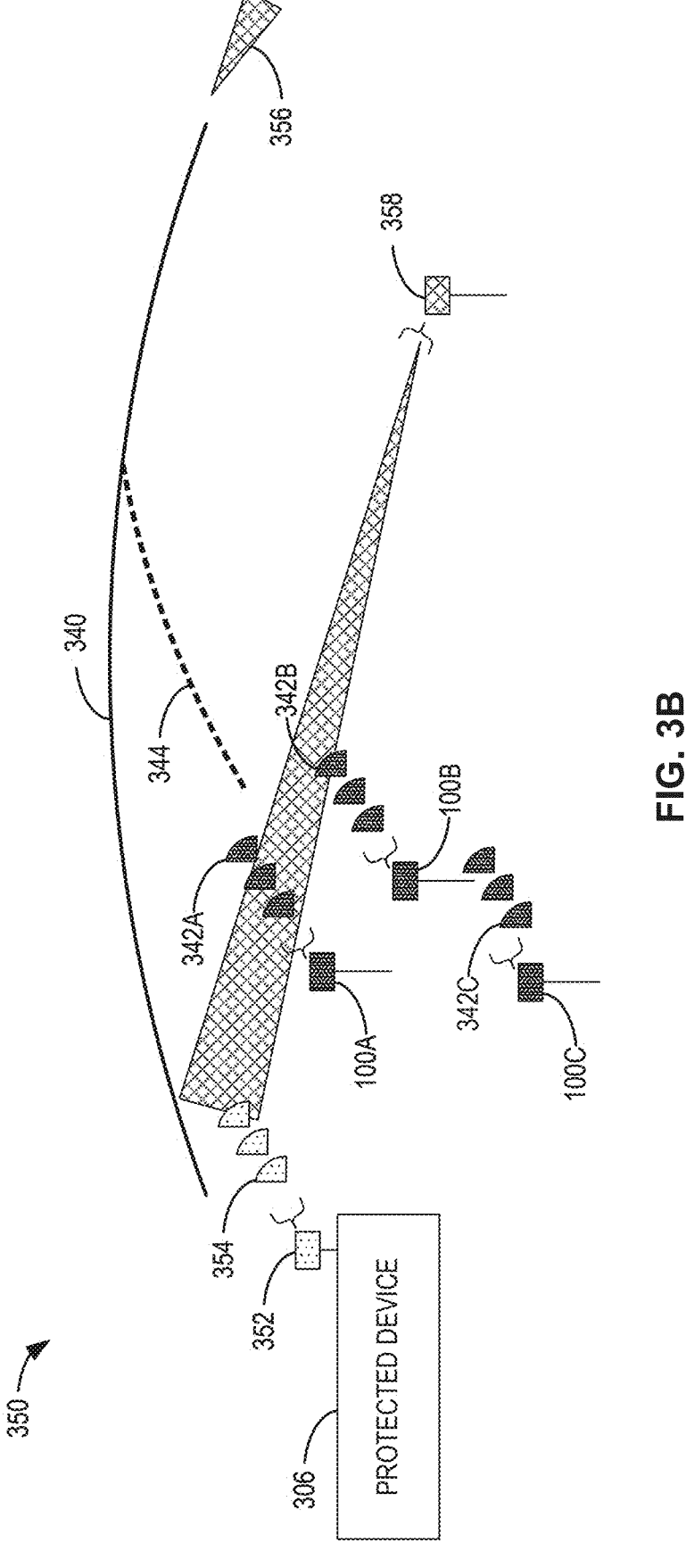
FIG. 3B illustrates a second example environment in which multiple example decoy devices can be used to implement an example decoy operation in accordance with teachings of this disclosure.

FIG. 3B illustrates a second example environment 350 in which multiple example decoy devices 100A, 100B, 100C can be used to implement an example decoy operation in accordance with teachings of this disclosure. In the illustrated example of FIG. 3B, the decoy devices 100A, 100B, 100C are utilized to protect a protected device 306 from one or more hostile measures (e.g., missile(s)) 356. In this example, the protected device 306 corresponds to a command post having a first example signal transmitter 352 to output (e.g., transmit, emit) one or more example device signals (e.g., transmission signals) 354. For example, the device signal(s) 354 from the first signal transmitter 352 may be used to communicate information, control operation of one or more devices, etc. Further, while the protected device 306 is a command post in this example, the protected device 306 can include one or more different devices (e.g., a radar, artillery, a surface to air missile, etc.) in some examples.

In the illustrated example of FIG. 3B, the hostile measure(s) 356 may be aimed at and/or directed toward the protected device 306 for the purpose of disabling and/or causing damage to the protected device 306. In some examples, a signal detector 358 associated with the hostile measure(s) 356 detects the device signal(s) 354 emitted by the protected device 306 to estimate a location of the protected device 306. Based on the detection, the hostile measure(s) 356 may follow a first trajectory (e.g., a planned trajectory) 340 to guide the hostile measure(s) 356 to the location of the protected device 306.

In the illustrated example of FIG. 3B, the decoy devices 100A, 100B, 100C can emit one or more respective example decoy signals 342A, 342B, 342C to confuse and/or to draw the hostile measure(s) 356 away from the protected device 306. For example, the example system control circuitry 304 of FIG. 3A can cause one(s) of the decoy devices 100A, 100B, 100C to emit the respective one(s) of the decoy signals 342A, 342B, 342C in a coordinated manner (e.g., sequentially, in a staggered manner, at substantially the same time and/or for substantially the same duration, etc.). In some such examples, when the signal detector 358 associated with the hostile measure(s) 356 detects the decoy signal(s) 342A, 342B, 342B, the hostile measure(s) 356 may be redirected along a second trajectory 344 (e.g., different from the first trajectory 340) toward one(s) of the decoy devices 100A, 100B, 100C and/or away from the protected device 306. As a result, the decoy device(s) 100A, 100B, 100D can reduce a likelihood of damage to and/or disablement of the protected device 306.

Figure 4:
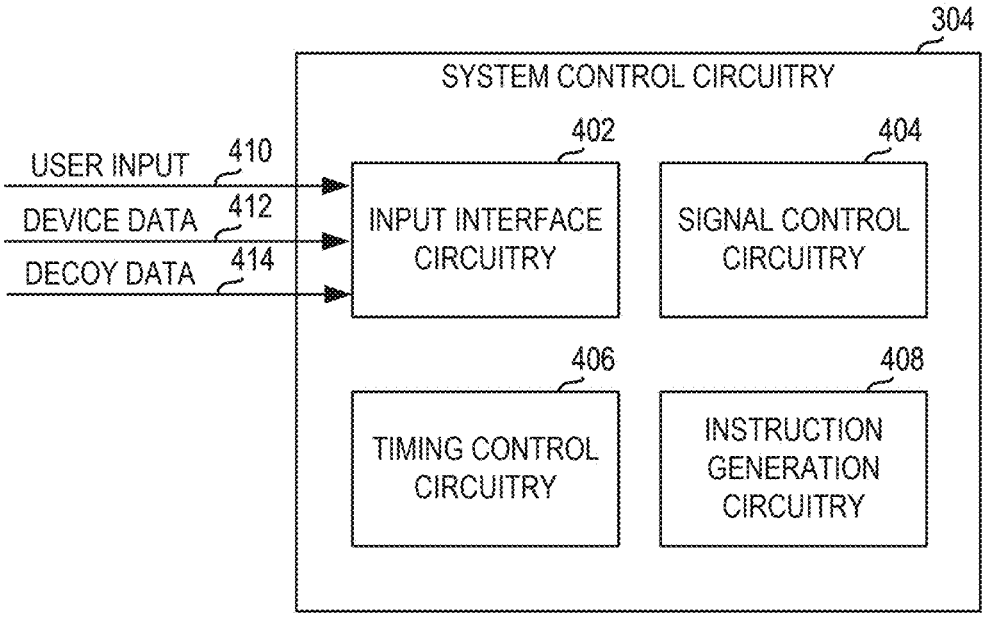
FIG. 4 is a block diagram of an example implementation of the example system control circuitry of FIG. 3A.

FIG. 4 is a block diagram of an example implementation of the example system control circuitry 304 of FIG. 3A. The system control circuitry 304 of FIG. 4 may be instantiated (e.g., creating an instance of, bring into being for any length of time, materialize, implement, etc.) by programmable circuitry such as a Central Processor Unit (CPU) executing first instructions. Additionally or alternatively, the system control circuitry 304 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

In the illustrated example of FIG. 4, the system control circuitry 304 includes example input interface circuitry 402, example signal control circuitry 404, example timing control circuitry 406, and example instruction generation circuitry 408.

The input interface circuitry 402 of FIG. 4 accesses, obtains, and/or otherwise receives example input data utilized by the system control circuitry 304. For example, the input interface circuitry 402 can access example user input 410 provided to an example user device (e.g., an electronic device, a remote device) implementing and/or communicatively coupled to the system control circuitry 304. In some examples, the user input 410 can include example signal characteristic(s) and/or example timing characteristic(s) for one or more example signals (e.g., decoy signal(s)) to be emitted by one or more example decoy devices (e.g., the first decoy device 100A and/or the second decoy device 100B of FIG. 3A). Additionally or alternatively, the input interface circuitry 402 can access and/or obtain example device data 412 associated with one(s) of the protected device(s) 306 of FIG. 3A, and/or example decoy data 414 associated with one(s) of the decoy devices 100A, 100B of FIG. 3A. In some examples, the device data 412 includes device location(s) (e.g., ground truth location(s), first geographic location(s)) corresponding to the protected device(s) 306, and the decoy data 414 includes decoy location(s) (e.g., second geographic location(s)) corresponding to the decoy device(s) 100A, 100B. In some examples, the device data 412 further includes known signal characteristic(s) (e.g., device signal characteristic(s)) of one or more example device signals emitted (and/or expected to be emitted) by the protected device(s) 306. In some examples, the input interface circuitry 402 is instantiated by programmable circuitry executing input interface circuitry instructions and/or configured to perform operations such as those represented by the flowchart(s) of FIG. 6.

The signal control circuitry 404 of FIG. 4 selects and/or determines one or more example decoy signal characteristics for respective one(s) of the signals (e.g., decoy signal(s)) to be emitted by the respective decoy devices 110A, 110B. For example, the decoy signal characteristic(s) can include at least one of a waveform time, a frequency, or an amplitude corresponding to the respective decoy signal(s). In some examples, the signal control circuitry 404 selects the decoy signal characteristic(s) based on the user input 410. Additionally or alternatively, the signal control circuitry 404 can select the decoy signal characteristic(s) based on the device signal characteristic(s) included in the device data 412. For example, the signal control circuitry 404 selects and/or utilizes the device signal characteristic(s) for corresponding one(s) of the decoy signal characteristic(s), such that the decoy signal(s) to be emitted by one(s) of the decoy devices 100A, 100B resemble (e.g., mimic, emulate) one(s) of the device signal(s) emitted by the protected device(s) 306. In some examples, the signal control circuitry 404 is instantiated by programmable circuitry executing signal control circuitry instructions and/or configured to perform operations such as those represented by the flowchart(s) of FIG. 6.

The timing control circuitry 406 of FIG. 4 selects and/or determines one or more example timing characteristics (e.g., decoy timing characteristic(s)) for respective one(s) of the decoy signals to be emitted by the respective decoy devices 110A, 110B. For example, the timing characteristic(s) can include start time(s) and/or duration(s) corresponding to respective one(s) of the decoy signals. In some examples, the timing control circuitry 406 selects the timing characteristic(s) based on the user input 410. Additionally or alternatively, the timing control circuitry 406 can select the timing characteristic(s) based on location(s) of the respective decoy device(s) 100A, 100B represented in the decoy data 414. For example, the timing control circuitry 406 can select the start time(s) and/or the duration(s) such that one(s) of the decoy devices 100A, 100B in a particular geographic area emit the decoy signal(s) simultaneously and/or in a coordinated manner. In some examples, the timing control circuitry 406 can select the start time(s) and/or the duration(s) such that one(s) of the decoy devices 100A, 100B emit the decoy signal(s) in a staggered and/or sequential manner. For example, the timing control circuitry 406 can select, based on distances between the protected device(s) 306 and the respective decoy devices 100A, 100B, an example sequence based on which the decoy devices 100A, 100B are to emit the respective decoy signals (e.g., such that the decoy signals are emitted at increasing distances from the protected device(s) 306). In some examples, the timing control circuitry 406 is instantiated by programmable circuitry executing timing control circuitry instructions and/or configured to perform operations such as those represented by the flowchart(s) of FIG. 6.

The instruction generation circuitry 408 of FIG. 4 generates and/or transmits example instructions corresponding to respective one(s) of the decoy devices 100A, 100B and/or the protected device(s) 306. For example, for respective one(s) of the decoy devices 100A, 100B, the instruction generation circuitry 408 generates example decoy instructions based on the decoy signal characteristic(s) and/or the timing characteristic(s) selected by the signal control circuitry 404 and/or the timing control circuitry 406, respectively. Additionally or alternatively, the instruction generation circuitry 408 generates example device instructions for the respective protected device(s) 306, where the device instructions can include time(s) and/or duration(s) for which the respective protected device(s) 306 are to be shut off and/or deactivated.

In some examples, the instruction generation circuitry 408 provides (e.g., sends, transmits) the device instructions to respective one(s) of the protected device(s) 306. In some such examples, based on execution of the respective device instructions by the protected device(s), the protected device(s) 306 can automatically (e.g., without manual intervention) shut down and/or halt signal emission at the respective time(s) and/or for the respective duration(s) indicated by the device instructions. Additionally or alternatively, the instruction generation circuitry 408 can cause presentation and/or display of the device instructions to an operator (e.g., via an example user device, a remote device, etc.) to instruct the operator to manually shut down and/or turn on (e.g., activate and/or deactivate) the respective protected device(s) 306.

In some examples, the instruction generation circuitry 408 provides (e.g., sends, transmits) the decoy instructions to the decoy control circuitry 302A, 302B of the respective one(s) of the decoy device(s) 100A, 100B. In some such examples, the decoy device(s) 100A, 100B emit one or more signals based on execution of the respective decoy instructions. In some examples, the instruction generation circuitry 408 is instantiated by programmable circuitry executing instruction generation circuitry instructions and/or configured to perform operations such as those represented by the flowchart(s) of FIG. 6.

Figure 5:
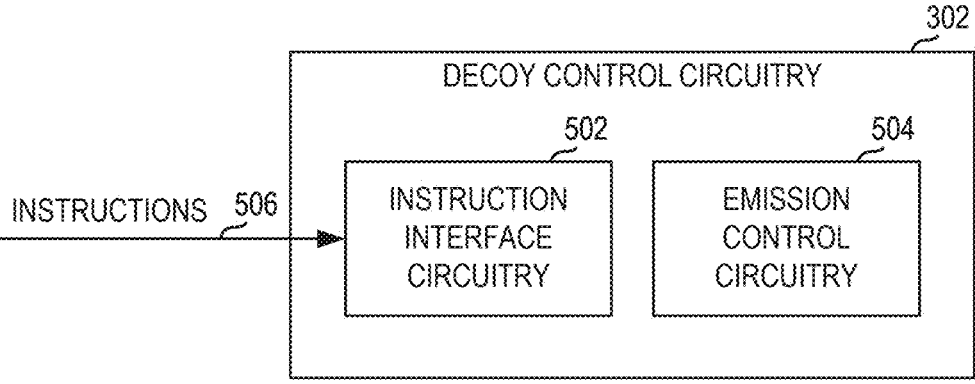
FIG. 5 is a block diagram of an example implementation of the example decoy control circuitry of FIG. 3A.

FIG. 5 is a block diagram of an example implementation of the example decoy control circuitry 302 (e.g., the first decoy control circuitry 302A and/or the second decoy control circuitry 302B) of FIG. 3A. The decoy control circuitry 302 of FIG. 5 may be instantiated (e.g., creating an instance of, bring into being for any length of time, materialize, implement, etc.) by programmable circuitry such as a Central Processor Unit (CPU) executing first instructions. Additionally or alternatively, the decoy control circuitry 302 of FIG. 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

In the illustrated example of FIG. 5, the decoy control circuitry 302 includes example instruction interface circuitry 502 and example emission control circuitry 504.

The example instruction interface circuitry 502 of FIG. 5 accesses, obtains, and/or receives example instructions (e.g., machine-readable instructions) 506 for a corresponding decoy device 100 (e.g., the first decoy device 100A and/or the second decoy device 100B of FIG. 3A) implementing the decoy control circuitry 302. In some examples, the instruction interface circuitry 502 obtains and/or accesses the instructions 506 stored in the example memory device 214 (e.g., the first memory device 214A and/or the second memory device 214B). Additionally or alternatively, the instruction interface circuitry 502 obtains and/or receives the instructions 506 generated and/or transmitted by the system control circuitry 304. In some examples, the instructions 506 include example signal characteristic(s) and/or example timing characteristic(s) for one or more example signals (e.g., decoy signal(s)) to be emitted by the decoy device 100. In some examples, the instruction interface circuitry 502 is instantiated by programmable circuitry executing instruction interface circuitry instructions and/or configured to perform operations such as those represented by the flowchart(s) of FIG. 7.

The example emission control circuitry 504 of FIG. 5 selects, generates, and/or causes emission of the decoy signal(s) by the corresponding decoy device 100. For example, the emission control circuitry 504 generates the decoy signal(s) based on the signal characteristic(s) included in the instructions 506. In some examples, the emission control circuitry 504 is electrically and/or operatively coupled to the example emitter 108 of the decoy device 100, such that the emission control circuitry 504 can cause emission of the generated decoy signal(s) by the emitter 108. In some examples, the emission control circuitry 504 causes the emission of the decoy signal(s) based on the timing characteristic(s) included in the instructions 506. For example, the emission control circuitry 504 can cause the decoy signal(s) to be emitted (e.g., by the emitter 108) at the start time(s) and/or for the duration(s) represented in the timing characteristic(s). In some examples, the emission control circuitry 504 is instantiated by programmable circuitry executing emission control circuitry instructions and/or configured to perform operations such as those represented by the flowchart(s) of FIG. 7.

In some examples, the system control circuitry 304 includes means for obtaining input. For example, the means for obtaining input may be implemented by the input interface circuitry 402. In some examples, the input interface circuitry 402 may be instantiated by programmable circuitry such as the example programmable circuitry 812 of FIG. 8. For instance, the input interface circuitry 402 may be instantiated by executing machine executable instructions such as those implemented by at least blocks 602, 616 of FIG. 6. In some examples, the input interface circuitry 402 may be instantiated by hardware logic circuitry, which may be implemented by an ASIC, XPU, or an FPGA configured and/or structured to perform operations corresponding to the machine readable instructions. Additionally or alternatively, the input interface circuitry 402 may be instantiated by any other combination of hardware, software, and/or firmware. For example, the input interface circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the system control circuitry 304 includes means for selecting a signal characteristic. For example, the means for selecting a signal characteristic may be implemented by the signal control circuitry 404. In some examples, the signal control circuitry 404 may be instantiated by programmable circuitry such as the example programmable circuitry 812 of FIG. 8. For instance, the signal control circuitry 404 may be instantiated by executing machine executable instructions such as those implemented by at least block 604 of FIG. 6. In some examples, the signal control circuitry 404 may be instantiated by hardware logic circuitry, which may be implemented by an ASIC, XPU, or an FPGA configured and/or structured to perform operations corresponding to the machine readable instructions. Additionally or alternatively, the signal control circuitry 404 may be instantiated by any other combination of hardware, software, and/or firmware. For example, the signal control circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the system control circuitry 304 includes means for selecting a timing characteristic. For example, the means for selecting a timing characteristic may be implemented by the timing control circuitry 406. In some examples, the timing control circuitry 406 may be instantiated by programmable circuitry such as the example programmable circuitry 812 of FIG. 8. For instance, the timing control circuitry 406 may be instantiated by executing machine executable instructions such as those implemented by at least block 606 of FIG. 6. In some examples, the timing control circuitry 406 may be instantiated by hardware logic circuitry, which may be implemented by an ASIC, XPU, or an FPGA configured and/or structured to perform operations corresponding to the machine readable instructions. Additionally or alternatively, the timing control circuitry 406 may be instantiated by any other combination of hardware, software, and/or firmware. For example, the timing control circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the system control circuitry 304 includes means for generating instructions. For example, the means for generating instructions may be implemented by the instruction generation circuitry 408. In some examples, the instruction generation circuitry 408 may be instantiated by programmable circuitry such as the example programmable circuitry 812 of FIG. 8. For instance, the instruction generation circuitry 408 may be instantiated by executing machine executable instructions such as those implemented by at least blocks 608, 610, 612, 614 of FIG. 6. In some examples, the instruction generation circuitry 408 may be instantiated by hardware logic circuitry, which may be implemented by an ASIC, XPU, or an FPGA configured and/or structured to perform operations corresponding to the machine readable instructions. Additionally or alternatively, the instruction generation circuitry 408 may be instantiated by any other combination of hardware, software, and/or firmware. For example, the instruction generation circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the decoy control circuitry 302 includes means for accessing instructions. For example, the means for accessing instructions may be implemented by the instruction interface circuitry 502. In some examples, the instruction interface circuitry 502 may be instantiated by programmable circuitry such as the example programmable circuitry 912 of FIG. 9. For instance, the instruction interface circuitry 502 may be instantiated by executing machine executable instructions such as those implemented by at least blocks 702, 708 of FIG. 7. In some examples, the instruction interface circuitry 502 may be instantiated by hardware logic circuitry, which may be implemented by an ASIC, XPU, or an FPGA configured and/or structured to perform operations corresponding to the machine readable instructions. Additionally or alternatively, the instruction interface circuitry 502 may be instantiated by any other combination of hardware, software, and/or firmware. For example, the instruction interface circuitry 502 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the decoy control circuitry 302 includes means for generating a signal. For example, the means for generating a signal may be implemented by the emission control circuitry 504. In some examples, the emission control circuitry 504 may be instantiated by programmable circuitry such as the example programmable circuitry 912 of FIG. 9. For instance, the emission control circuitry 504 may be instantiated by executing machine executable instructions such as those implemented by at least blocks 704, 706 of FIG. 7. In some examples, the emission control circuitry 504 may be instantiated by hardware logic circuitry, which may be implemented by an ASIC, XPU, or an FPGA configured and/or structured to perform operations corresponding to the machine readable instructions. Additionally or alternatively, the emission control circuitry 504 may be instantiated by any other combination of hardware, software, and/or firmware. For example, the emission control circuitry 504 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the system control circuitry 304 of FIG. 3A is illustrated in FIG. 4, one or more of the elements, processes, and/or devices illustrated in FIG. 4 may be combined, divided, re-arranged, omitted, eliminated, and/or implemented in any other way. Further, the example input interface circuitry 402, the example signal control circuitry 404, the example timing control circuitry 406, the example instruction generation circuitry 408, and/or, more generally, the example system control circuitry 304 of FIG. 4, may be implemented by hardware alone or by hardware in combination with software and/or firmware. Thus, for example, any of the example input interface circuitry 402, the example signal control circuitry 404, the example timing control circuitry 406, the example instruction generation circuitry 408, and/or, more generally, the example system control circuitry 304, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example system control circuitry 304 of FIG. 4 may include one or more elements, processes, and/or devices in addition to, or instead of, those illustrated in FIG. 4, and/or may include more than one of any or all of the illustrated elements, processes and devices.

A flowchart representative of example machine readable instructions, which may be executed by programmable circuitry to implement and/or instantiate the system control circuitry 304 of FIG. 4 and/or representative of example operations which may be performed by programmable circuitry to implement and/or instantiate the system control circuitry 304 of FIG. 4, is shown in FIG. 6. The machine readable instructions may be one or more executable programs or portion(s) of one or more executable programs for execution by programmable circuitry such as the programmable circuitry 812 shown in the example processor platform 800 discussed below in connection with FIG. 8. In some examples, the machine readable instructions cause an operation, a task, etc., to be carried out and/or performed in an automated manner in the real world. As used herein, "automated" means without human involvement.

While an example manner of implementing the decoy control circuitry 302 of FIG. 3A is illustrated in FIG. 5, one or more of the elements, processes, and/or devices illustrated in FIG. 5 may be combined, divided, re-arranged, omitted, eliminated, and/or implemented in any other way. Further, the example instruction interface circuitry 502, the example emission control circuitry 504, and/or, more generally, the example decoy control circuitry 302 of FIG. 5, may be implemented by hardware alone or by hardware in combination with software and/or firmware. Thus, for example, any of the example instruction interface circuitry 502, the example emission control circuitry 504, and/or, more generally, the example decoy control circuitry 302, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example decoy control circuitry 302 of FIG. 5 may include one or more elements, processes, and/or devices in addition to, or instead of, those illustrated in FIG. 5, and/or may include more than one of any or all of the illustrated elements, processes and devices.

Figure 7:
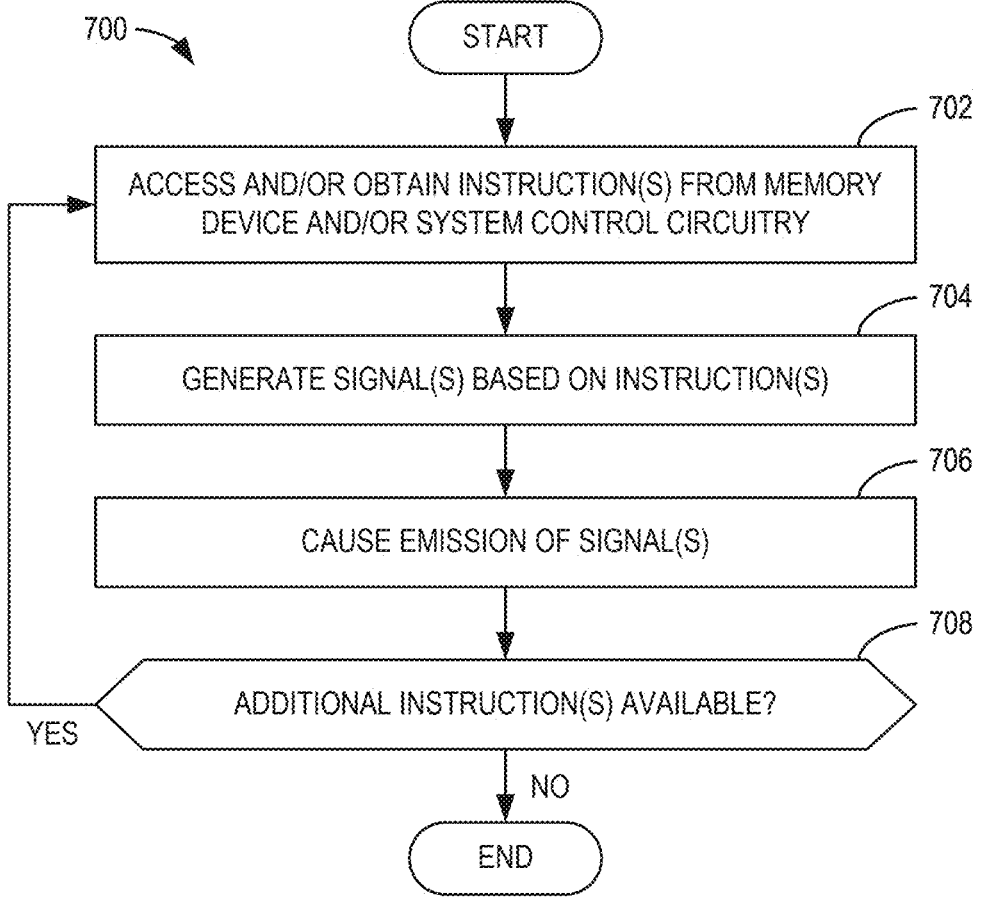
FIG. 7 is a flowchart representative of example machine readable instructions and/or example operations that may be executed, instantiated, and/or performed by example programmable circuitry to implement the example decoy control circuitry of FIG. 5.

A flowchart representative of example machine readable instructions, which may be executed by programmable circuitry to implement and/or instantiate the decoy control circuitry 302 of FIG. 5 and/or representative of example operations which may be performed by programmable circuitry to implement and/or instantiate the decoy control circuitry 302 of FIG. 5, is shown in FIG. 7. The machine readable instructions may be one or more executable programs or portion(s) of one or more executable programs for execution by programmable circuitry such as the programmable circuitry 912 shown in the example processor platform 900 discussed below in connection with FIG. 9. In some examples, the machine readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6 and/or 7, many other methods of implementing the example system control circuitry 304 and/or the decoy control circuitry 302 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and/or 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 6 is a flowchart representative of example machine readable instructions and/or example operations 600 that may be executed, instantiated, and/or performed by programmable circuitry to implement the example system control circuitry 304 of FIGS. 3 and/or 4. The example machine-readable instructions and/or the example operations 600 of FIG. 6 begin at block 602, at which the example system control circuitry 304 accesses and/or obtains the example user input 410, the example device data 412, and/or the example decoy data 414 of FIG. 4. For example, the example input interface circuitry 402 of FIG. 4 obtains and/or accesses the example user input 410 provided via an example user device. In some examples, the input interface circuitry 402 obtains the device data 412 associated with the example protected device(s) 306 of FIG. 3A, and/or obtains the decoy data 414 associated with the example decoy device(s) 100A, 100B of FIG. 3A.

At block 604, the example system control circuitry 304 selects and/or determines example signal characteristic(s) for corresponding one(s) of the decoy devices 100A, 100B. For example, the example signal control circuitry 404 of FIG. 4 selects, based on the user input 410 and/or the device data 412, first signal characteristic(s) for a first example decoy signal to be emitted by the first decoy device 100A, and/or second signal characteristic(s) for a second example decoy signal to be emitted by the second decoy device 100B. In some examples, the signal characteristic(s) include at least one of a frequency, an amplitude, a waveform type, etc. corresponding to the respective decoy signal(s).

At block 606, the example system control circuitry 304 selects and/or determines example timing characteristic(s) for corresponding one(s) of the decoy devices 100A, 100B. For example, the example timing control circuitry 406 of FIG. 4 selects, based on the user input 410, the device data 412, and/or the decoy data 414, first timing characteristic(s) for the first decoy signal to be emitted by the first decoy device 100A, and/or second timing characteristic(s) for the second decoy signal to be emitted by the second decoy device 100B. In some examples, the timing characteristic(s) include example start time(s) and/or example duration(s) corresponding to the respective decoy signal(s).

At block 608, the example system control circuitry 304 generates first example instructions (e.g., decoy instructions) based on the selected signal characteristic(s) and/or timing characteristic(s). For example, the example instruction generation circuitry 408 of FIG. 4 generates first example decoy instructions corresponding to the first decoy device 100A based on the first signal characteristic(s) and/or the first timing characteristic(s), and/or generates second example decoy instructions corresponding to the second decoy device 100B based on the second signal characteristic(s) and/or the second timing characteristic(s).

At block 610, the example system control circuitry 304 transmits the first instructions to the corresponding decoy device(s) 100A, 100B. For example, the instruction generation circuitry 408 transmits the first decoy instructions to the first decoy device 100A to cause emission of first decoy signal(s) based on the first signal characteristic(s) and/or the first timing characteristic(s), and/or transmits the second decoy instructions to the second decoy device 100B to cause emission of second decoy signal(s) based on the second signal characteristic(s) and/or the second timing characteristic(s).

At block 612, the example system control circuitry 304 generates second example instructions (e.g., device instructions) for the protected device(s) 306 of FIG. 3A. For example, the instruction generation circuitry 408 generates the second instructions based on the timing characteristic(s) selected for one(s) of the decoy devices 100A, 100B. In some examples, the second instructions indicate example time(s) at which the emission of signal(s) from protected device(s) 306 is to be halted and/or example duration(s) for which the emission of the signal(s) is to be halted.

At block 614, the example system control circuitry 304 transmits the second instructions to the corresponding protected device(s) 306. For example, the instruction generation circuitry 408 transmits the second instructions to the protected device(s) 306 to cause the protected device(s) 306 to be shut off at the selected time(s) and/or for the selected duration(s) represented in the second instructions.

At block 616, the example system control circuitry 304 determines whether to continue monitoring. For example, the input interface circuitry 402 determines whether to continue monitoring based on whether one or more of the decoy devices 100A, 100B are deployed and/or operational. In response to the input interface circuitry 402 determining to continue monitoring (e.g., block 616 returns a result of YES), control returns to block 602. Alternatively, in response to the input interface circuitry 402 determining not to continue monitoring (e.g., block 616 returns a result of NO), control ends.

FIG. 7 is a flowchart representative of example machine readable instructions and/or example operations 700 that may be executed, instantiated, and/or performed by programmable circuitry to implement the example decoy control circuitry 302 of FIGS. 3 and/or 5. The example machine-readable instructions and/or the example operations 700 of FIG. 7 begin at block 702, at which the example decoy control circuitry 302 accesses, obtains, and/or receives the example instructions 506 of FIG. 5. For example, the example instruction interface circuitry 502 of FIG. 5 accesses the instructions 506 from the example memory device 214 implemented in the corresponding example decoy device 100 (e.g., the first decoy device 100A and/or the second decoy device 100B). Additionally or alternatively, the instruction interface circuitry 502 accesses and/or receives the instructions 506 from the example system control circuitry 304 of FIGS. 3 and/or 4.

At block 704, the example decoy control circuitry 302 generates one or more example signals (e.g., decoy signal(s)) based on the instructions 506. For example, the example emission control circuitry 504 of FIG. 5 generates the signal(s) based on example signal characteristic(s) included in the instructions 506, where the signal characteristic(s) include a frequency, an amplitude, a waveform type, etc. corresponding to the signal(s).

At block 706, the example decoy control circuitry 302 causes emission of the signal(s). For example, based on example timing characteristic(s) (e.g., start time(s) and/or duration(s)) included in the instructions 506, the emission control circuitry 504 causes emission of the signal(s) by the example emitter 108 of the corresponding decoy device 100.

At block 708, the example decoy control circuitry 302 determines whether additional instructions are available for the corresponding decoy device 100. For example, the instruction interface circuitry 502 determines whether additional instructions are received from the system control circuitry 304 of FIGS. 3 and/or 4, and/or whether a new memory device including the additional instructions has been installed on and/or implemented by the decoy device 100. In response to the instruction interface circuitry 502 determining that additional instructions are available (e.g., block 708 returns a result of YES), control returns to block 702. Alternatively, in response to the instruction interface circuitry 502 determining that additional instructions are not available (e.g., block 708 returns a result of NO), control ends.

Figure 8:
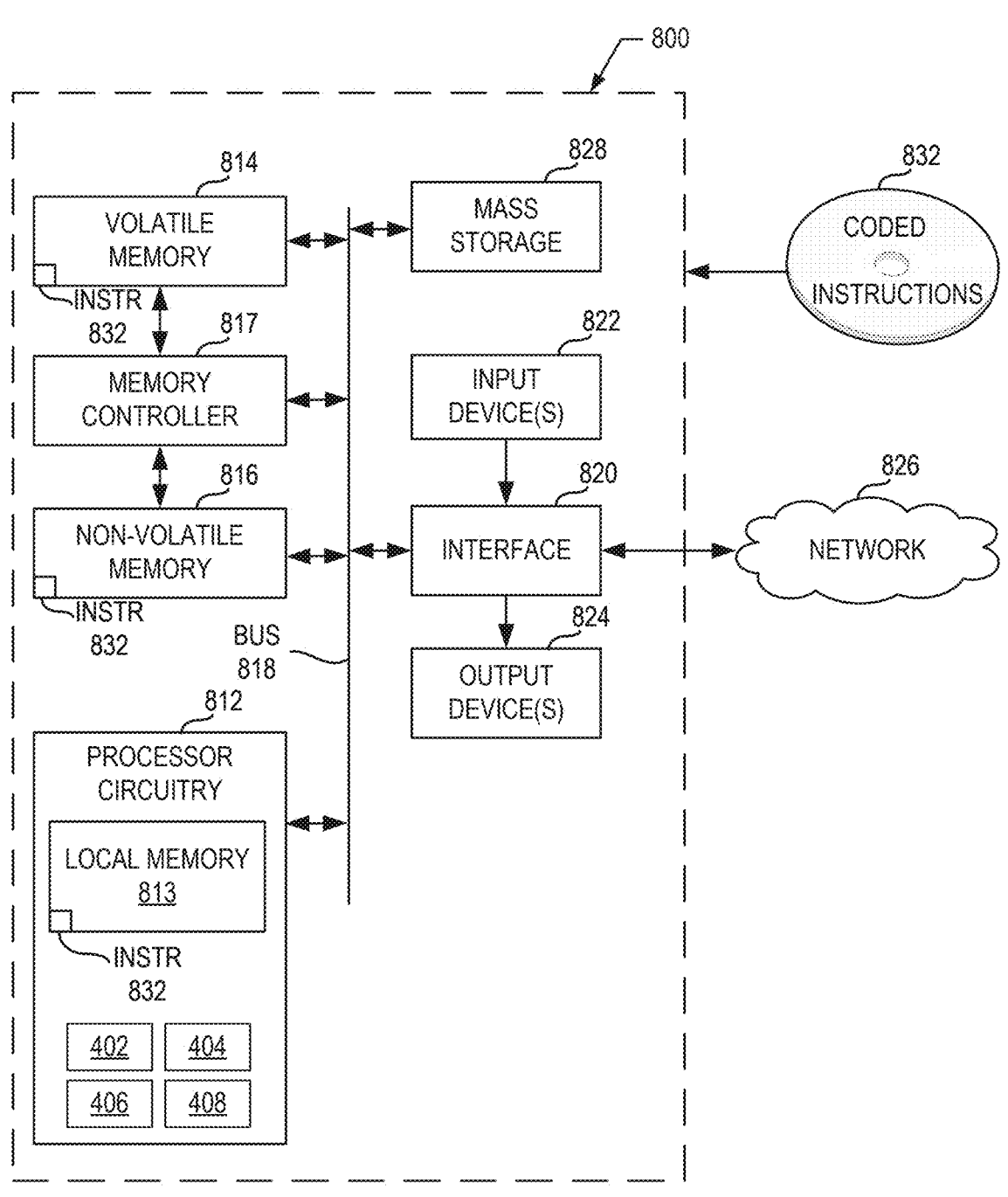
FIG. 8 is a block diagram of an example processing platform including programmable circuitry structured to execute, instantiate, and/or perform the example machine readable instructions and/or perform the example operations of FIG. 6 to implement the example system control circuitry of FIG. 4.

FIG. 8 is a block diagram of an example programmable circuitry platform 800 structured to execute and/or instantiate the example machine-readable instructions and/or the example operations of FIG. 6 to implement the system control circuitry 304 of FIG. 4. The programmable circuitry platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based)

devices. In this example, the programmable circuitry 812 implements the example input interface circuitry 402, the example signal control circuitry 404, the example timing control circuitry 406, and the example instruction generation circuitry 408.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data.

Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIG. 6, may be stored in the mass storage device 828, in the volatile memory 814, in the non-volatile memory 816, and/or on at least one non-transitory computer readable storage medium such as a CD or DVD which may be removable.

Figure 9:
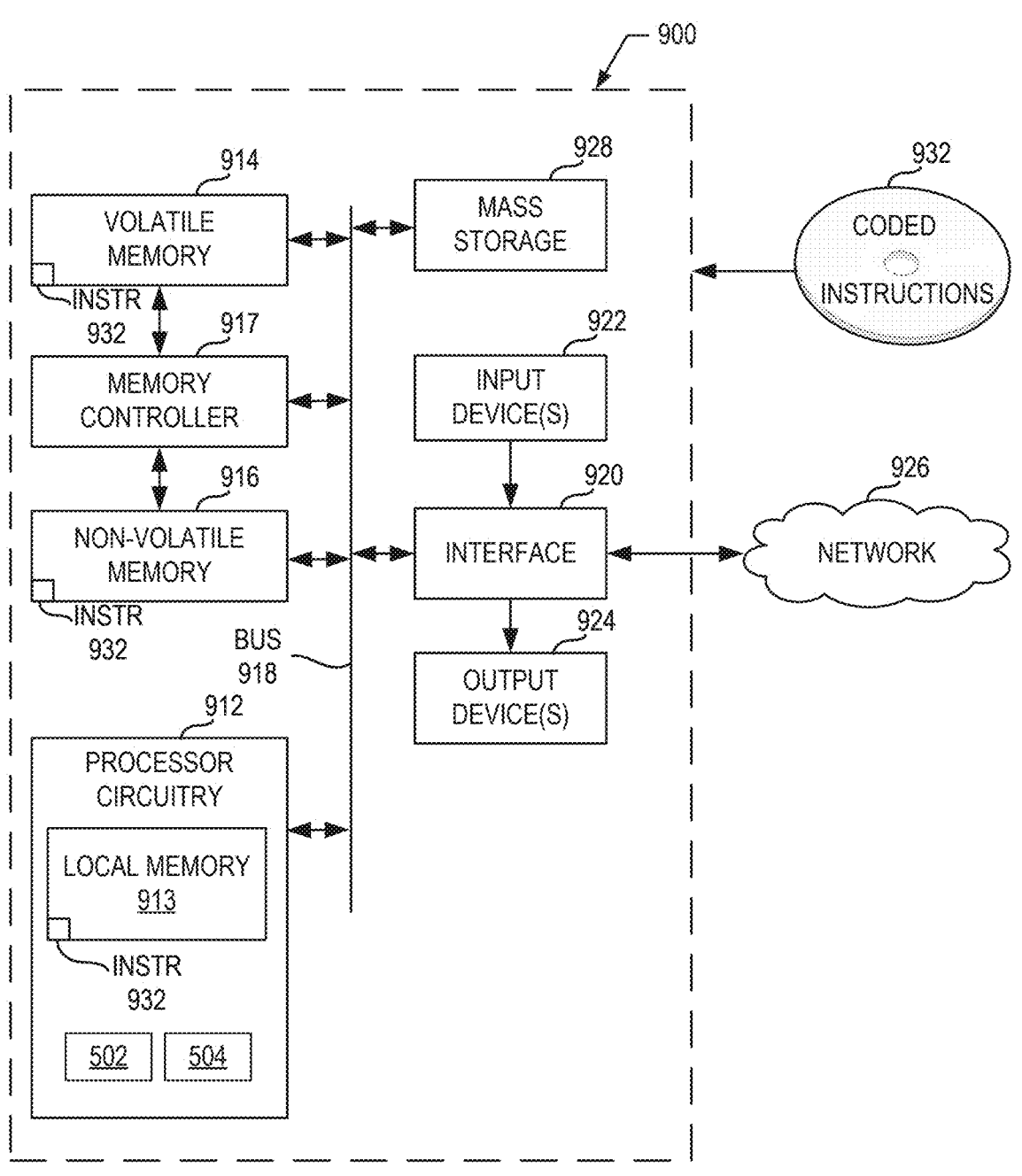
FIG. 9 is a block diagram of an example processing platform including programmable circuitry structured to execute, instantiate, and/or perform the example machine readable instructions and/or perform the example operations of FIG. 7 to implement the example decoy control circuitry of FIG. 5.

FIG. 9 is a block diagram of an example programmable circuitry platform 900 structured to execute and/or instantiate the example machine-readable instructions and/or the example operations of FIG. 7 to implement the decoy control circuitry 302 of FIG. 5. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the example instruction interface circuitry 502 and the example emission control circuitry 504.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIG. 7, may be stored in the mass storage device 928, in the volatile memory 914, in the non-volatile memory 916, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that protect one or more devices from damage and/or interference by hostile measures. Disclosed herein is an example decoy device (e.g., an electronic decoy device) that can emit first signal(s) that resemble (e.g., mimic, emulate) second signal(s) associated with the protected device(s). In some examples, example system control circuitry is communicatively and/or operatively coupled to multiple ones of the decoy devices to cause emission of the signal(s) by the respective decoy devices in a coordinated manner. In some such examples, the multiple decoy devices can resemble a relatively large and/or complex system of protected device(s), and/or can resemble movement of the protected device(s) within a geographic area. As a result, examples disclosed herein can draw and/or redirect hostile measures to the decoy device(s) and/or away from the protected device(s). Advantageously, disclosed systems, apparatus, articles of manufacture, and methods improve the efficiency of using a computing device by reducing a likelihood of damage to and/or interference with the protected device(s), thereby reducing cost associated with repair and/or replacement of the protected device(s). Disclosed systems, apparatus, articles of manufacture, and methods are accordingly directed to one or more improvement(s) in the operation of a machine such as a computer or other electronic and/or mechanical device.

An example electronic decoy apparatus and associated methods are disclosed herein. Further examples and combinations thereof include the following:

Example 1 includes an apparatus comprising a housing, a signal emitter coupled to the housing, a processor coupled to the housing and electrically coupled to the signal emitter, and a memory device operatively coupled to the processor, the memory device including machine-readable instructions to cause the processor to generate a first signal to be emitted by the signal emitter, the first signal to resemble a second signal emitted by at least one protected device.

Example 2 includes the apparatus of example 1, further including a battery positioned in the housing and electrically coupled to the processor, and a solar panel coupled to the housing and electrically coupled to the battery.

Example 3 includes the apparatus of example 2, wherein at least one of the signal emitter or the solar panel are foldable toward an outer surface of the housing.

Example 4 includes the apparatus of example 1, wherein the housing includes an opening to receive a post, the post to removably couple the housing to a ground.

Example 5 includes the apparatus of example 1, wherein the housing is removably coupled to an unmanned ground vehicle, the housing movable with the unmanned ground vehicle.

Example 6 includes the apparatus of example 1, further including system control circuitry communicatively coupled to the processor, the system control circuitry to select at least one of a signal characteristic or a timing characteristic of the first signal.

Example 7 includes the apparatus of example 6, wherein the system control circuitry is to temporarily halt emission of the second signal by the at least one protected device when the first signal is emitted by the signal emitter.

Example 8 includes an apparatus comprising memory, first machine-readable instructions, and at least one processor circuit to be programmed by the first machine-readable instructions to at least generate second machine-readable instructions corresponding to a decoy device, and transmit the second machine-readable instructions to processor circuitry of the decoy device, the second machine-readable instructions to cause the processor circuitry to generate a first signal to be emitted by the decoy device, the first signal to resemble a second signal emitted by at least one protected device.

Example 9 includes the apparatus of example 8, wherein one or more of the at least one processor circuit is to temporarily halt emission of the second signal by the at least one protected device.

Example 10 includes the apparatus of example 8, wherein the second machine-readable instructions include at least one of a signal characteristic or a timing characteristic corresponding to the first signal.

Example 11 includes the apparatus of example 10, wherein the signal characteristic includes at least one of a waveform type, an amplitude, or a frequency of the first signal, the timing characteristic including at least one of a duration or a start time of the first signal.

Example 12 includes the apparatus of example 8, wherein one or more of the at least one processor circuit is to generate the second machine-readable instructions based on user input.

Example 13 includes the apparatus of example 8, wherein the decoy device is a first decoy device, the processor circuitry is first processor circuitry, and one or more of the at least one processor circuit is to transmit third machine-readable instructions to second processor circuitry of a second decoy device, the third machine-readable instructions to cause the second decoy device to emit a third signal, the third signal to resemble the first signal and the second signal.

Example 14 includes the apparatus of example 13, wherein the second machine-readable instructions are to cause the first decoy device to emit the first signal for a first duration, the third machine-readable instructions are to cause the second decoy device to emit the third signal for a second duration, the second duration following the first duration.

Example 15 includes an apparatus comprising processor circuitry, and machine-readable instructions to cause the processor circuitry to generate a first signal to be emitted by a decoy device, the first signal to resemble a second signal emitted by at least one protected device.

Example 16 includes the apparatus of example 15, wherein the processor circuitry is to access the machine-readable instructions from a memory device coupled to the processor circuitry.

Example 17 includes the apparatus of example 15, wherein the processor circuitry is first processor circuitry, the first processor circuitry to receive the machine-readable instructions from second processor circuitry communicatively coupled to the first processor circuitry.

Example 18 includes the apparatus of example 17, wherein the second processor circuitry is to temporarily halt emission of the second signal by the at least one protected device.

Example 19 includes the apparatus of example 17, wherein the decoy device is a first decoy device, the machine-readable instructions are first machine-readable instructions, the second processor circuitry to transmit second machine-readable instructions to third processor circuitry of a second decoy device, the second machine-readable instructions to cause the second decoy device to emit a third signal, the third signal to resemble the first signal and the second signal.

Example 20 includes the apparatus of example 19, wherein the first machine-readable instructions are to cause the first decoy device to emit the first signal for a first duration, the second machine-readable instructions are to cause the second decoy device to emit the third signal for a second duration, the second duration following the first duration.

Example 21 includes a method comprising generating a first signal based on machine-readable instructions, and causing emission of the first signal by a decoy device, the first signal to resemble a second signal emitted by at least one protected device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a first housing positioned at a first distance from at least one protected device;
a second housing positioned at a second distance from the at least one protected device, the second distance greater than the first distance;
a first signal emitter coupled to the first housing;
a second signal emitter coupled to the second housing;
a first processor coupled to the first housing and electrically coupled to the first signal emitter;
a second processor coupled to the second housing and electrically coupled to the second signal emitter;
a first memory device operatively coupled to the first processor, the first memory device including first machine-readable instructions to cause the first processor to generate a first signal to be emitted by the first signal emitter at a first start time, the first signal to resemble a second signal emitted by the at least one protected device; and
a second memory device operatively coupled to the second processor, the second memory device including second machine-readable instructions to cause the second processor to generate a third signal to be emitted by the second signal emitter at a second start time, the second start time after the first start time, the third signal to resemble the first signal and the second signal, the first start time and the second start time selected based on the first distance and the second distance.

2. The apparatus of claim 1, further including:
a battery positioned in the first housing and electrically coupled to the first processor; and
a solar panel coupled to the first housing and electrically coupled to the battery.

3. The apparatus of claim 2, wherein at least one of the first signal emitter or the solar panel are foldable toward an outer surface of the first housing.

4. The apparatus of claim 1, wherein the first housing includes an opening to receive a post, the post to removably couple the first housing to a ground.

5. The apparatus of claim 1, wherein the first housing is removably coupled to an unmanned ground vehicle, the first housing movable with the unmanned ground vehicle.

6. The apparatus of claim 1, further including system control circuitry communicatively coupled to the first processor, the system control circuitry to select at least one of a signal characteristic or a timing characteristic of the first signal.

7. The apparatus of claim 6, wherein the system control circuitry is to temporarily halt emission of the second signal by the at least one protected device when the first signal is emitted by the first signal emitter.

8. The apparatus of claim 1, wherein the first start time and the second start time are selected based on the first distance, the second distance, and a target travel speed of the at least one protected device.

9. An apparatus comprising:

memory;

first machine-readable instructions; and at least one processor circuit to be programmed by the first machine-readable instructions to at least:

generate second machine-readable instructions corresponding to a first decoy device positioned at a first distance from at least one protected device;

generate third machine-readable instructions corresponding to a second decoy device, the second decoy device positioned at a second distance from the at least one protected device, the second distance greater than the first distance;

select, based on the first distance and the second distance, a first start time for a first signal to be emitted by the first decoy device and a second start time for a second signal to be emitted by the second decoy device, the second start time after the first start time;

transmit the second machine-readable instructions to first processor circuitry of the first decoy device, the second machine-readable instructions to cause the first processor circuitry to generate the first signal to be emitted by the first decoy device at the first start time, the first signal to resemble a third signal emitted by the at least one protected device; and transmit the third machine-readable instructions to second processor circuitry of the second decoy device, the third machine-readable instructions to cause the second processor circuitry to generate the second signal to be emitted by the second decoy device at the second start time, the second signal to resemble the first signal and the third signal.

10. The apparatus of claim 9, wherein one or more of the at least one processor circuit is to temporarily halt emission of the third signal by the at least one protected device.

11. The apparatus of claim 9, wherein the second machine-readable instructions include at least one of a signal characteristic or a timing characteristic corresponding to the first signal.

12. The apparatus of claim 11, wherein the signal characteristic includes at least one of a waveform type, an amplitude, or a frequency of the first signal, the timing characteristic including at least one of a duration or the first start time of the first signal.

13. The apparatus of claim 9, wherein one or more of the at least one processor circuit is to generate the second machine-readable instructions based on user input.

14. The apparatus of claim 9, wherein the second machine-readable instructions are to cause the first decoy device to emit the first signal for a first duration, the third machine-readable instructions are to cause the second decoy device to emit the third second signal for a second duration, the second duration following the first duration.

15. An apparatus comprising:

first processor circuitry in a first decoy device, the first decoy device positioned at a first distance from at least one protected device;

second processor circuitry in a second decoy device, the second decoy device positioned at a second distance from the at least one protected device, the second distance greater than the first distance;

first machine-readable instructions to cause the first processor circuitry to generate a first signal to be emitted by the first decoy device at a first start time, the first signal to resemble a second signal emitted by the at least one protected device; and second machine-readable instructions to cause the second processor circuitry to generate a third signal to be emitted by the second decoy device at a second start time, the second start time after the first start time, the first start time and the second start time selected based on the first distance and the second distance, the third signal to resemble the first signal and the second signal.

16. The apparatus of claim 15, wherein the first processor circuitry is to access the first machine-readable instructions from a memory device coupled to the first processor circuitry.

17. The apparatus of claim 15, wherein the first processor circuitry is to receive the first machine-readable instructions from third processor circuitry communicatively coupled to the first processor circuitry.

18. The apparatus of claim 17, wherein the third processor circuitry is to temporarily halt emission of the second signal by the at least one protected device.

19. The apparatus of claim 15, wherein the first machine-readable instructions are to cause the first decoy device to emit the first signal for a first duration, the second machine-readable instructions are to cause the second decoy device to emit the third signal for a second duration, the second duration following the first duration.

20. A method comprising:

generating a first signal based on first machine-readable instructions;

causing emission of the first signal by a first decoy device at a first start time, the first signal to resemble a second signal emitted by at least one protected device, the first decoy device positioned at a first distance from the at least one protected device;

generating a third signal based on second machine-readable instructions; and causing emission of the third signal by a second decoy device at a second start time, the second start time after the first start time, the third signal to resemble the first signal and the second signal, the second decoy device positioned at a second distance from the at least one protected device, the second distance greater than the first distance, the first start time and the second start time selected based on the first distance and the second distance.

* * * * *